(12) United States Patent
De Leij et al.

(10) Patent No.: US 9,290,390 B2
(45) Date of Patent: Mar. 22, 2016

(54) ACTIVATED CHARCOAL

(75) Inventors: Franciscus Antonius Anna Maria De Leij, Guildford (GB); James Peter Stratford, Guildford (GB)

(73) Assignee: THE UNIVERSITY OF SURREY, Guildford (GB)

( * ) Notice: Subject to any disclaimer, the term of this patent is extended or adjusted under 35 U.S.C. 154(b) by 503 days.

(21) Appl. No.: 13/521,445

(22) PCT Filed: Jan. 10, 2011

(86) PCT No.: PCT/GB2011/050024
§ 371 (c)(1),
(2), (4) Date: Sep. 26, 2012

(87) PCT Pub. No.: WO2011/083338
PCT Pub. Date: Jul. 14, 2011

(65) Prior Publication Data
US 2013/0023409 A1   Jan. 24, 2013

(30) Foreign Application Priority Data

Jan. 11, 2010   (GB) .................................. 1000311.9

(51) Int. Cl.
| C01B 31/08 | (2006.01) |
| B01J 20/20 | (2006.01) |
| B01J 20/28 | (2006.01) |
| B01J 21/18 | (2006.01) |
| C05G 3/04 | (2006.01) |
| C02F 1/28 | (2006.01) |

(52) U.S. Cl.
CPC ................. *C01B 31/08* (2013.01); *B01J 20/20* (2013.01); *B01J 20/28057* (2013.01); *B01J 20/28088* (2013.01); *B01J 21/18* (2013.01); *C01B 31/081* (2013.01); *C05G 3/04* (2013.01); *C01P 2006/12* (2013.01); *C01P 2006/14* (2013.01); *C02F 1/283* (2013.01); *Y02E 50/10* (2013.01); *Y02E 50/14* (2013.01); *Y02E 50/30* (2013.01)

(58) Field of Classification Search
CPC ....................................................... C01B 31/08
See application file for complete search history.

(56) References Cited

FOREIGN PATENT DOCUMENTS

| GB | 2086867 | 5/1982 |
| WO | WO 96/29378 | 9/1996 |
| WO | WO 2007/088163 | 8/2007 |
| WO | WO 2009/016381 A2 | 2/2009 |

*Primary Examiner* — Stuart Hendrickson
(74) *Attorney, Agent, or Firm* — Geeta Kadambi; Riddhi IP LLC

(57) ABSTRACT

The invention provides a method for preparing activated charcoal from a precursor material comprising high mineral content plant or algal material by heating the precursor material under suitable conditions sufficient to produce activated charcoal therefrom. The invention also provides various applications of the activated charcoal per se.

12 Claims, 8 Drawing Sheets

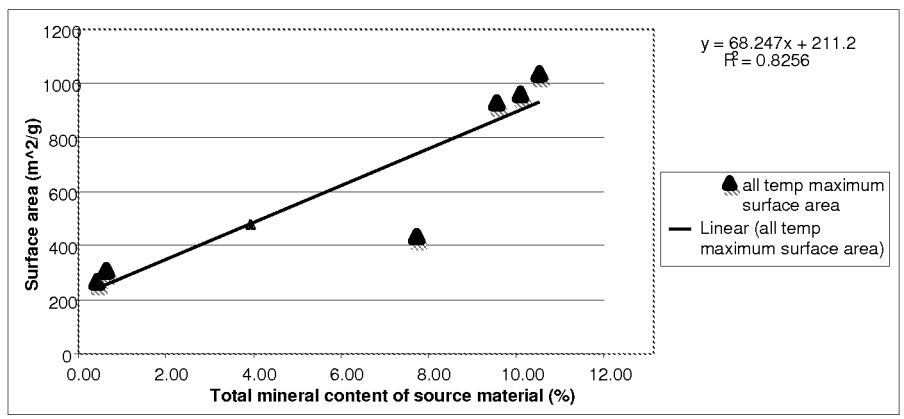
Figure: 1
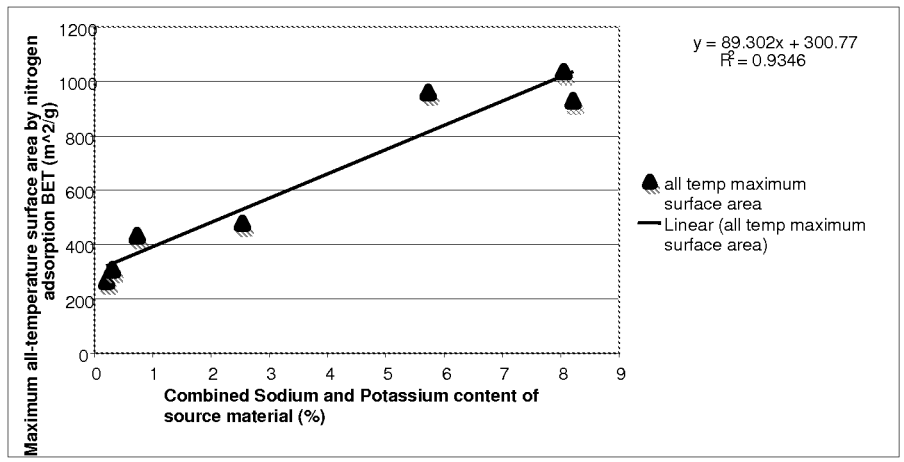
Figure: 2

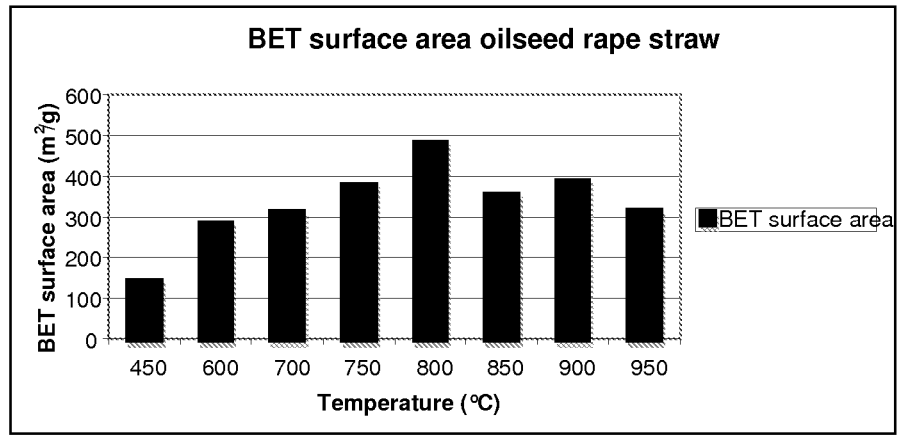
Figure: 3
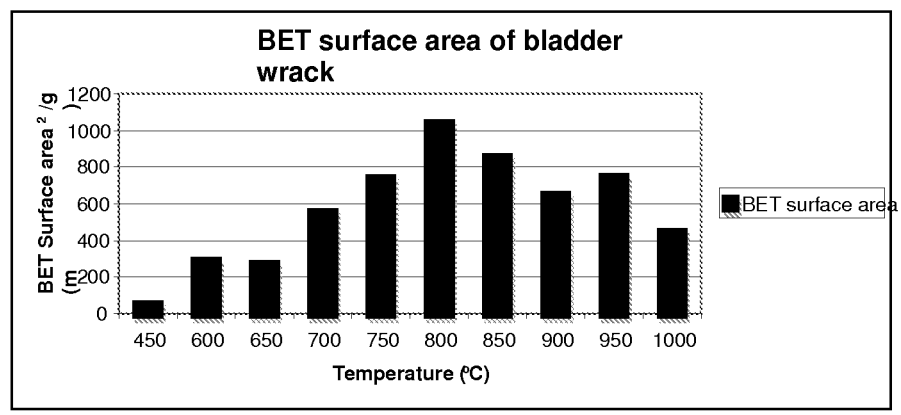
Figure: 4

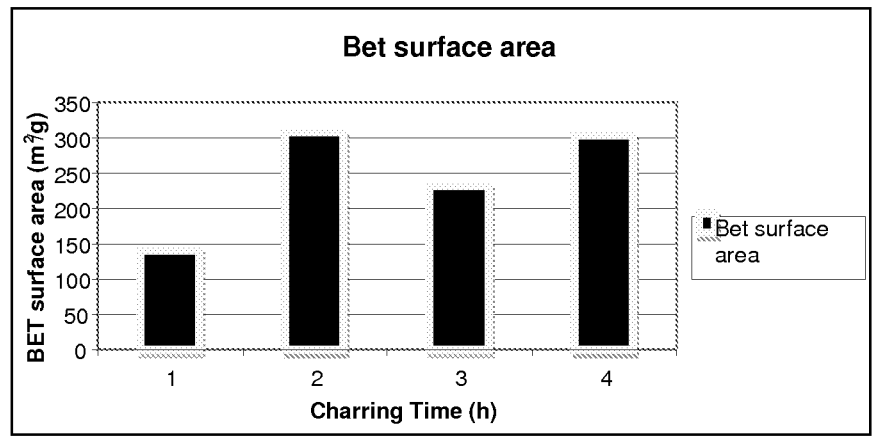
Figure: 5
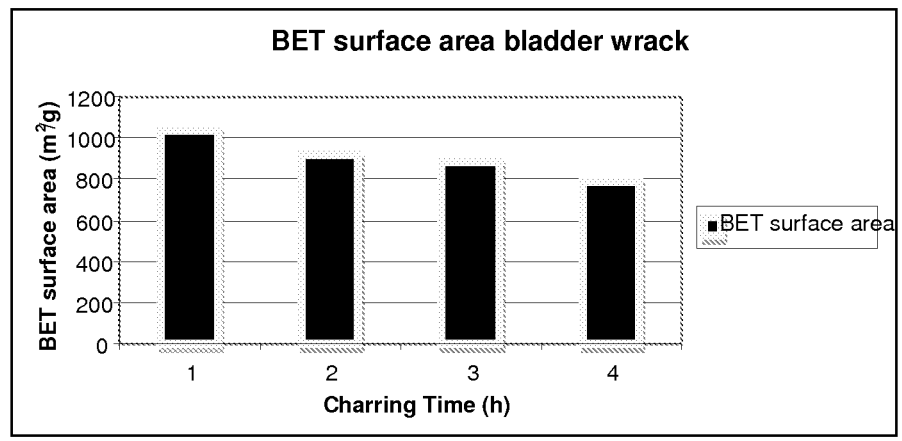
Figure: 6

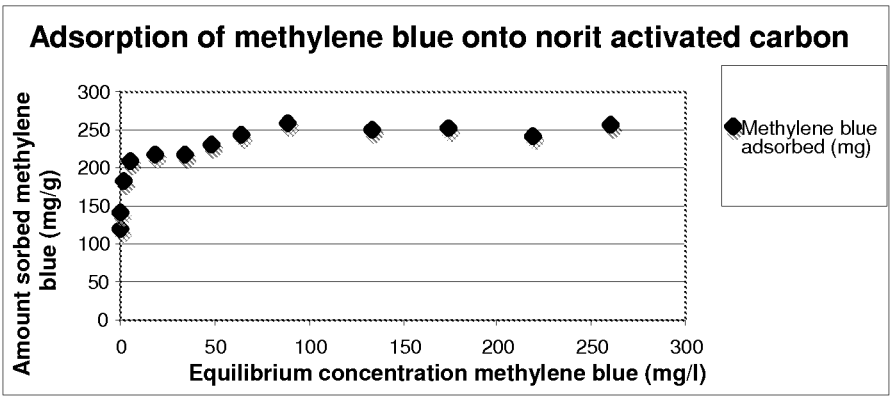
Figure: 7
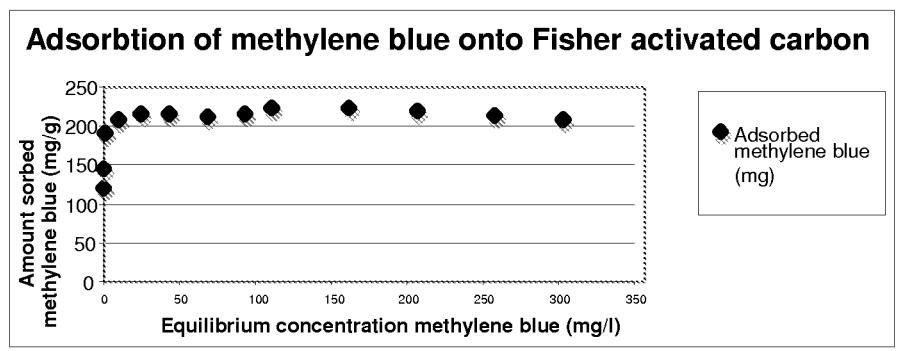
Figure: 8

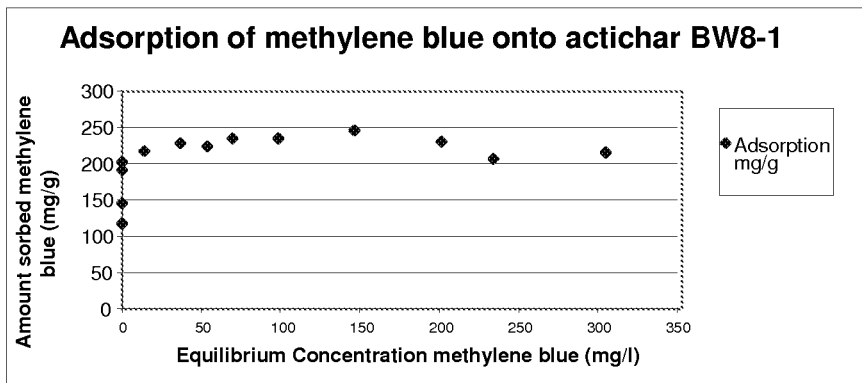
Figure: 9
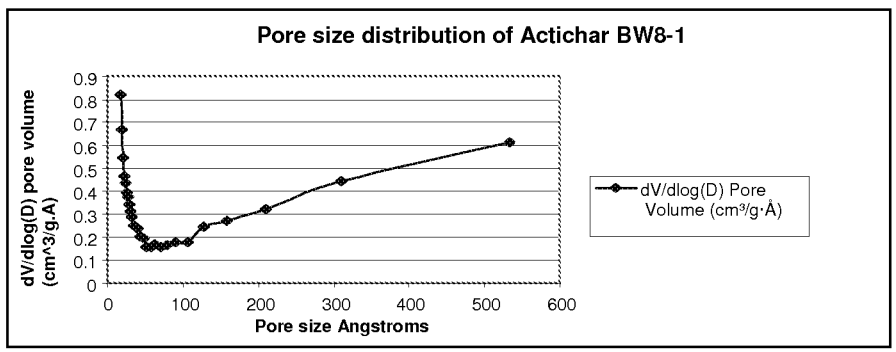
Figure: 10

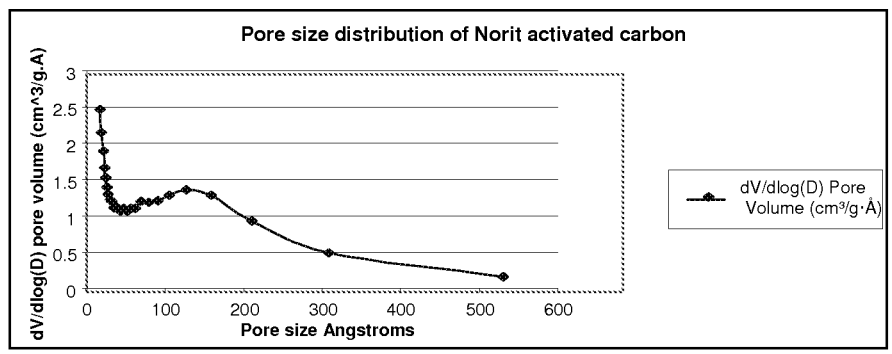
Figure: 11
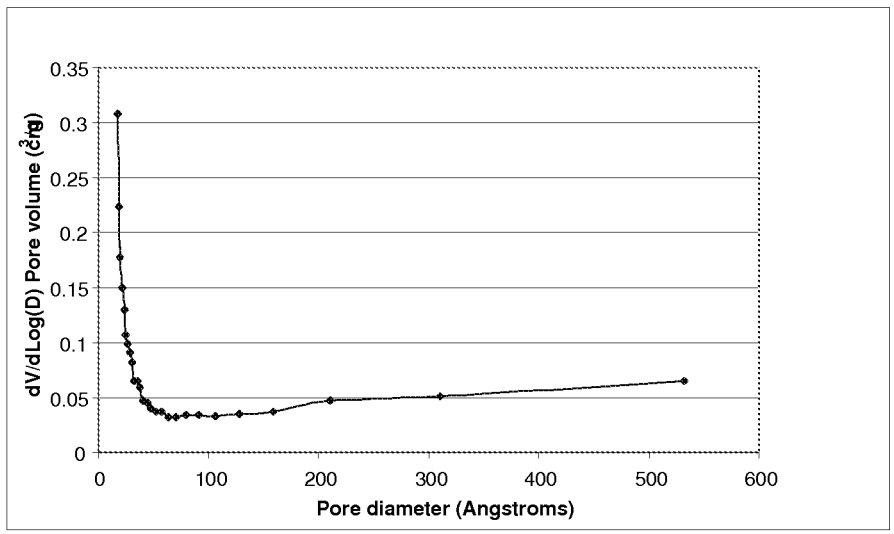
Figure: 12

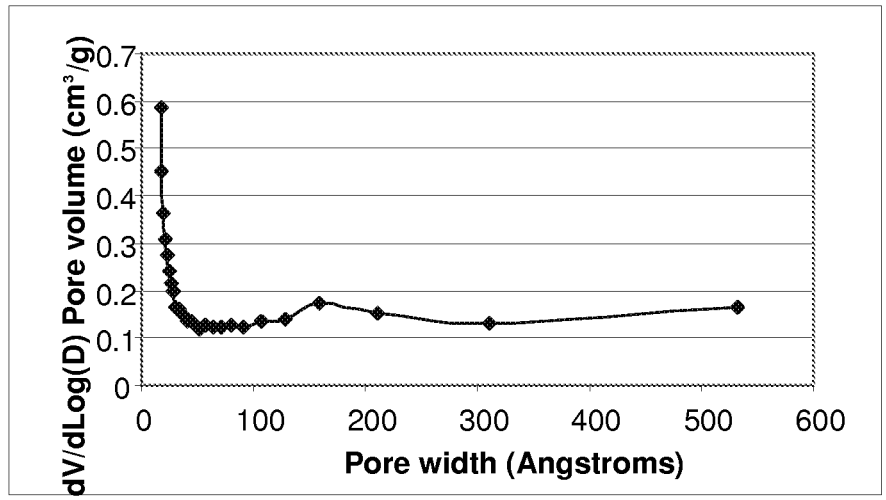
Figure: 13
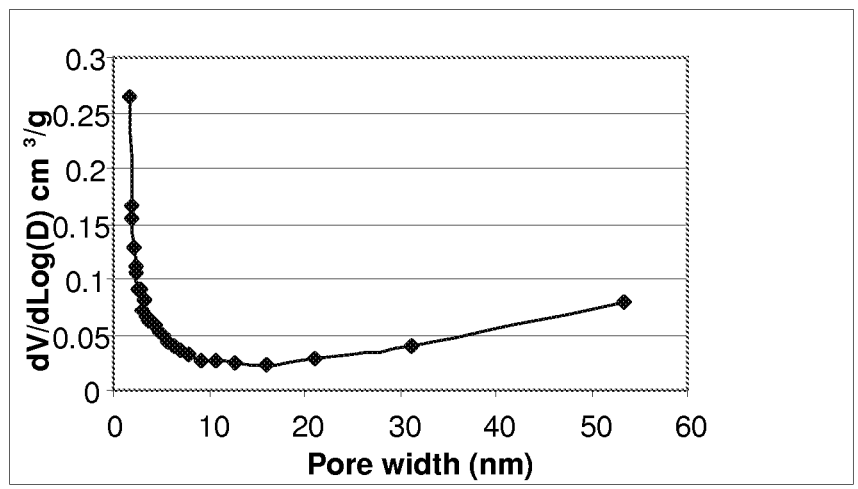
Figure: 14

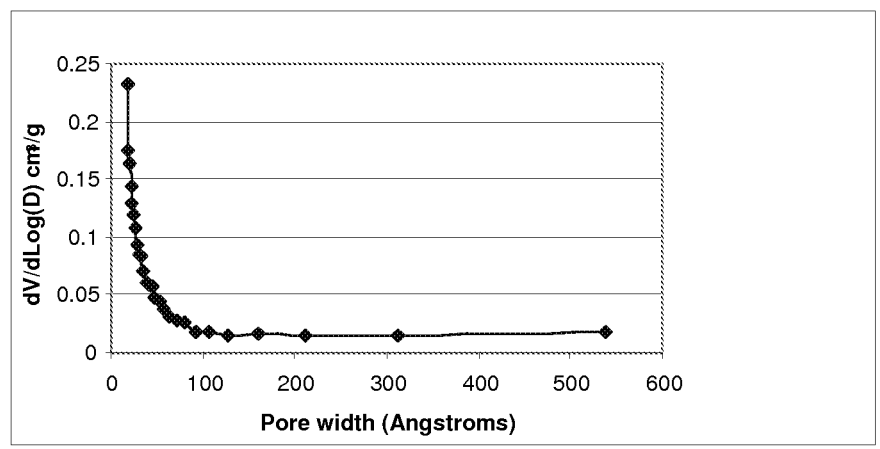
Figure: 15

ACTIVATED CHARCOAL

CROSS RELATION TO RELATED APPLICATION

This application is a national phase entry of PCT application PCT/GB2011/050024 filed on Jan. 10, 2010 and claims priority of the same. The disclosure is hereby incorporated by this reference in its entirety for all of its teachings.

FIELD OF TECHNOLOGY

The invention relates to activated charcoal, and in particular, to methods of producing activated charcoal from specific precursor materials that contain high levels of minerals. The invention extends to various applications of the activated charcoal, including, but not limited to, fluid purification and filtration, and for producing a mineral liquor for use in fertilisers etc.

BACKGROUND

Activated charcoal, also known as activated carbon, is a form of carbon that has been processed or 'activated' to make it extremely porous, such that it has a very large surface area and pore volume available for adsorption, or chemical reactions. For example, due to its high degree of porosity, one gram of activated charcoal has a surface area in excess of 500 $m^2/g$, and in some cases more than 2000 $m^2/g$, and a combined meso and micro pore volume of more than 0.40 $cm^3/g$. These characteristics can be determined by the Brunauer-Emmet-Teller (BET) method using nitrogen gas adsorption.

Activated charcoal can be used in water filters, such as for aquaria, or in air purification. Other uses for activated carbon include large-scale purification of potable water, adsorption of toxic materials from incinerator flue gas streams, and environmental remediation. A number of growth areas in electronics applications also use activated carbons, including electrodes for super capacitors, ultracapacitors, pseudocapacitors and electrochemical storage devices, such as lithium ion batteries. In the health industry, activated carbons are used to combat food poisoning and stomach upsets. In food processing, activated carbons are used to remove impurities from beverages and sugar syrup, for example.

Usually, activated charcoal is produced from low mineral carbonaceous precursor materials, such as wood, coal, or charcoals derived from coconut shells, nutshells and rice husks. The subsequent process of activation requires that the precursor materials are heated at high temperatures sometimes exceeding 1000° C. in the presence of exogenously added activating (i.e. oxidising) agents, such as carbon dioxide, oxygen, acids or superheated steam for several hours. Accordingly, known methods for producing activated charcoal involve the use of externally applied oxidising agents combined with very high activating temperatures for prolonged periods of time. Hence, these methods are reliant on the input of large amounts of energy and the addition of externally applied activating agents, and are therefore very expensive to carry out.

Furthermore, a major difficulty with using chemical activation processes is that it is very difficult to achieve a uniform distribution of the activating agent (e.g. dehydrating/oxidising agent) within the precursor material before treatment. As a result, in current methods for producing activated charcoal, the precursor material must be finely ground down, which is an expensive and time-consuming process, in order to achieve good mixing with the activation agent. There is therefore a requirement to provide a method for preparing activated charcoal which avoids the need to carry out these costly grinding steps prior to activation.

SUMMARY

In a first aspect, there is provided a method for preparing activated charcoal from a precursor material comprising high mineral content plant or algal material, the method comprising heating a precursor material comprising plant or algal material having a high mineral content, under conditions sufficient to produce activated charcoal therefrom.

In addition to plants, the inventors have also found that algae contain a high concentration of minerals, and therefore can also be used as suitable precursor materials for the method.

Whereas it is preferred that the plant material is fresh, partly decomposed plant material is rich in minerals too, and would make a suitable precursor for the method of the invention for preparing activated carbon.

In a second aspect, there is provided activated charcoal obtained from, or obtainable by, the method of the first aspect.

In a third aspect, there is provided use of the activated charcoal of the second aspect, in fluid purification or filtration applications. The fluid which may be filtered or purified may be liquid or gaseous. The activated charcoal may be used in air purification, for example in the elimination of toxic substances (either organic or inorganic) from flue gases of incinerators or other industrial plants. Volatile metals, such as mercury, may also be removed from air and flu gases. The charcoal may be used for the filtration of air for breathing either for personal protection as in the example of gas masks, or in the purification of atmospheres for buildings or other contained spaces. The charcoal may be used in water filtration, for example the filtration of water both potable and industrial effluent, as well as aquarium water.

An additional advantage of the method of the first aspect is that not only does it result in the production of an activated charcoal with a large surface area and pore volume, it also provides a means of recovering valuable minerals that can be subsequently used as plant fertilisers, since the precursor source material has high mineral concentrations of potassium, calcium, sodium and/or magnesium. Hence, the method of the first aspect may result in the production of a mineral liquor for use as a fertiliser. After heating to temperatures of greater than about 800° C., these minerals are deposited into pores of the charcoal as metal oxides. After the heating step, an activated charcoal is produced with pores that are filled with a variety of metal oxides. Using nitric acid, these minerals may be brought into solution and can be recovered as potassium nitrate, sodium nitrate, calcium nitrate and magnesium nitrate, all of which have high plant fertiliser value.

Therefore, in a fourth aspect, there is provided use of the activated charcoal of the second aspect for the manufacture of fertiliser.

In further aspects of the invention, the activated charcoal of the second aspect may be used for the treatment of acute drug overdose or poisoning by the direct adsorption of toxins or xenobiotics from bodily fluids and digestive juices; for the manufacture of battery electrodes, for example those of lithium ion batteries; the purification of industrial chemical products and agricultural products, such as sugar; or for remediation of contaminated soils, solid wastes or natural bodies of water (including subterranean aquifers and ground water) associated with such materials in the environment; and the recovery of gold.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures and following Examples.

BRIEF DESCRIPTION OF DRAWINGS

FIG. 1 shows the relationship between the total mineral content of source material and the maximum achievable surface area of activated carbons derived from each;

FIG. 2 shows the relationship between combined K and Na content of source material and maximum achievable surface area of activated carbons derived from each;

FIG. 3 shows the effect of temperature on BET surface area of intrinsically activated carbons produced from oilseed rape straw;

FIG. 4 shows the effect of temperature on BET surface area of intrinsically activated carbons produced from bladder wrack;

FIG. 5 shows the effect of charring time (h) at 600° C. on BET surface area of intrinsically activated carbons produced from bladder wrack;

FIG. 6 shows the effect of charring time (h) at 800° C. on BET surface area of intrinsically activated carbons produced from bladder wrack;

FIG. 7 shows an adsorption isotherm of Norit decolourisation carbon using a range of methylene blue concentrations in water;

FIG. 8 shows an adsorption isotherm of Fisher decolourisation carbon using a range of methylene blue concentrations in water;

FIG. 9 shows an adsorption isotherm of Bladder wrack carbon (BW8-1) using a range of methylene blue concentrations in water;

FIG. 10 shows the pore size distribution curve for the most highly activated carbon (Bladderwrack pyrolysed at 800° C.);

FIG. 11 shows the pore size distribution curve for the commercially available activated carbon from Norit;

FIG. 12 shows the pore size distribution of intrinsically activated sea beet carbon measured by BJH nitrogen adsorption;

FIG. 13 shows the pore size distribution of intrinsically activated nettle carbon measured by BJH nitrogen adsorption;

FIG. 14 shows the pore size distribution of intrinsically activated rape straw measured by BJH nitrogen adsorption; and FIG. 15 shows the pore size distribution of intrinsically activated *eucalyptus* bark measured by BJH nitrogen adsorption.

DETAILED DESCRIPTION

The inventors have surprisingly found that certain source or precursor materials derived from plants, plant parts or from algae naturally incorporate the minerals that are required for activation, and that these minerals are dispersed uniformly throughout their tissues, thus reducing the expense and complexity of the activation process. Based on this finding, the inventors have developed a more efficient method for producing activated charcoal.

As discussed above, prior art methods for producing activated charcoal require the use of externally applied or exogenously added activation agents. However, advantageously, the method of the invention allows the production of activated charcoal using a simple process, which does not require the use of exogenously added activating agents, such as carbon dioxide, acids, heated steam, carbonates, hydroxides, etc, and is therefore much cheaper to run than known methods for producing activated charcoal. The process of activation in this invention relies on the fact that the minerals are already present in the precursor material, which minerals are transformed during a charring process to allow activation of the carbon, i.e. a process that the inventors have named 'intrinsic activation'. Furthermore, because the agents (i.e. minerals) necessary for activation are already uniformly embedded within the precursor material being heat-treated, there is no need for carrying out expensive grinding steps, or incorporation processes, which are used in prior art methods for producing activated charcoal.

In contrast to traditional precursor materials that are used for the production of activated carbons, which have low mineral contents, the precursor material that is used in the method of the first aspect has a high mineral content. The term "high mineral content" can refer to the concentration of elements or ions contained within the precursor material before it is heated to cause activation. The precursor material may comprise a high concentration of alkali and/or alkaline earth metals. For example, the concentration of alkali and/or alkali earth metals in the precursor material may be at least 10,000 mg/kg, at least 20,000 mg/kg, at least 35,000 mg/kg, at least 50,000 mg/kg, at least 60,000 mg/kg, at least 75,000 mg/kg, at least 100,000 mg/kg or at least 125,000 mg/kg of dried precursor material. The term "dried precursor material" can mean material that has been suitably treated (e.g. warming at about 100° C. for 48 hrs) in order to reduce or remove its water content. The concentration of alkali and/or alkali earth metals in the dried precursor material may be at least 150,000 mg/kg, at least 175,000 mg/kg, at least 200,000 mg/kg or at least 220,000 mg/kg of dried precursor material. Examples of alkali metal and alkaline earth metals may include potassium, calcium, sodium and/or magnesium.

Thus, the precursor material may have a high concentration of potassium or potassium ions. The concentration of potassium may be at least 10,000 mg/kg of dried precursor material, at least 15,000 mg/kg, at least 20,000 mg/kg, at least 30,000 mg/kg, at least 40,000 mg/kg, at least 50,000 mg/kg or at least 60,000 mg/kg of dried precursor material. Preferably, the concentration of potassium is at least 70,000 mg/kg, at least 75,000 mg/kg, at least 80,000 mg/kg, at least 90,000 mg/kg or at least 95,000 mg/kg of dried precursor material.

The precursor material may have a high concentration of magnesium or magnesium ions. The concentration of magnesium may be at least 1,000 mg/kg, at least 2,000 mg/kg, at least 4,000 mg/kg or at least 5,000 mg/kg of dried precursor material. Preferably, the concentration of magnesium is at least 8,000 mg/kg, at least 10,000 mg/kg, at least 12,000 mg/kg or at least 15,000 mg/kg of dried precursor material.

The precursor material may have a high concentration of calcium or calcium ions. The concentration of calcium may be at least 3,000 mg/kg, at least 5,000 mg/kg, at least 10,000 mg/kg, at least 15,000 mg/kg or at least 20,000 mg/kg dried precursor material. Preferably, the concentration of calcium is at least 30,000 mg/kg, at least 40,000 mg/kg, at least 50,000 mg/kg or at least 60,000 mg/kg of dried precursor material.

The precursor material may have a high concentration of sodium or sodium ions. The concentration of sodium may be at least 1,000 mg/kg, at least 2,000 mg/kg, at least 3,000 mg/kg or at least 4,000 mg/kg of dried precursor material. Preferably, the concentration of sodium is at least 20,000 mg/kg, at least 30,000 mg/kg, at least 40,000 mg/kg, at least 45,000 mg/kg, 60,000 mg/kg or at least 80,000 mg/kg of dried precursor material.

The precursor material may comprise any combination of any of the foregoing elements (i.e. minerals) at any of the above-mentioned concentrations. Thus, the precursor material may be rich (i.e. comprise a high concentration) in potassium, calcium, sodium and/or magnesium. The total concentration of potassium, magnesium, calcium and/or sodium may be at least 20,000 mg/kg, at least 35,000 mg/kg, at least 50,000 mg/kg, at least 70,000 mg/kg, at least 75,000 mg/kg, at least 80,000 mg/kg, at least 90,000 mg/kg, at least 100,000 mg/kg or at least 125,000 mg/kg of dried precursor material. Preferably, the total concentration of potassium, magnesium, calcium and/or sodium is at least 100,000 mg/kg, at least 150,000 mg/kg, at least 175,000 mg/kg, at least 200,000 mg/kg or at least 220,000 mg/kg of dried precursor material.

The preferred mineral contents mentioned above are preferably derived from dried precursor material, i.e. dried biomass precursor material. However, when this material is charred, for example at a temperature less than about at 450° C., the mineral content of the material may be two to five times higher than when dried plant precursor material is used. Charred biomass material is a precursor material that falls under this invention. Therefore, by way of example only, Table 2 provides mineral contents of charred (at 450° C.) biomass materials (oil seed rape and sea beet), and Table 3 provides the high mineral content of dried (i.e. modest heating to remove water) oil seed rape straw, sea beet, *eucalyptus* bark, sea beet leaves, bladder wrack and nettle stems and leaves. For Table 2, the total mineral concentration of oilseed rape straw and sea beet, charred at 450° C. is 156,000 mg/kg and 222,000 mg/kg, respectively. For Table 3, the total mineral content of the dried biomass precursor material is 30,940 mg/kg and 90,570 mg/kg respectively.

As described in the Examples, the inventors have tested a variety of precursor materials having a high mineral concentration (i.e. high combined concentrations of the elements potassium, magnesium, calcium and/or sodium), and have found that certain species of plants (woody and non-woody) and seaweeds (macro-algae) are particularly useful as precursor materials for producing activated charcoal. Thus, in embodiments where the precursor material comprises plant material, it may comprise or be derived from a woody plant material. For example, the precursor material may comprise or be derived from any hardwood species of plant. Alternatively, the precursor material may comprise or be derived from a softwood species, for example a conifer. The precursor material may comprise or be derived from any woody material which has a high mineral content, such as from the family Myrtaceae, e.g. *Eucalyptus*.

Preferably, however, the precursor material comprises non-woody plant material, or is derived from any non-woody plant species. Examples of non-woody plant materials, which may be used in the method, include those derived from a plant family selected from the group of families consisting of Brassicaceae, Amaranthaceae and Urticaceae. Examples of non-woody plant materials may include those derived from a genus selected from the group of genuses consisting of *Urtica*, *Brassica*, *Spinacia* and *Beta*. Suitable species of non-woody plant material may include *Urtica dioica* (nettle), *Spinacea oleracea* (spinach), *Brassica napus* (oilseed rape), or *Beta vulgaris* (sea beet and mangel-wurzel and swiss chard).

Suitable precursor material used in the method may be derived from any part of a plant, for example the trunk (i.e. inner core wood, sap wood or outer bark), a stem (i.e. inner or outer sections), the branches (inner or outer sections), a root (i.e. inner or outer sections), or a leaf. In embodiments where the precursor material is derived from a woody plant, it is preferred that the bark is used, since this usually has a higher concentration of minerals (such as potassium) than inner core wood. In general, fast growing plants, or the parts of plants that grow fast (e.g. the leaves or roots), have high mineral contents, and provide a suitable precursor material for the method of the first aspect.

In their experiments, the inventors exposed the precursor material to a range of different conditions, including various temperatures, and different exposure times, and then tested the surface area of the resultant material to see how effective the heating conditions had been in producing activated charcoal. The inventors found that precursor material that was heated to about 800° C. (or at least 800° C. or more in some embodiments) produced high surface areas, and in some cases greater than 1000 $m^2g^{-1}$. This was most surprising since the method does not involve the use of any chemical modification, or the addition of any exogenous activation chemicals, such as carbon dioxide and/or super-heated steam, which are normally used in the manufacture of activated charcoals. Therefore, the precursor material may be exposed to a temperature of at least 800° C., but limited activation may take place at lower temperatures depending on the minerals that are present in the precursor materials. For example, if the mineral content of the precursor material is dominated by calcium, then an activation temperature of about 800° C. (or greater than 800° C. in some embodiments) may be preferred, while precursor materials comprising predominantly potassium may be activated at temperatures as low as about 400° C. to 600° C., or 500° C. to 600° C. In embodiments where the precursor material comprises significant quantities of magnesium, the activation temperature may be as low as 300° C.

Therefore, the precursor material may be heated to a temperature of at least 300° C., at least 350° C., at least 400° C., at least 450° C., at least 500° C., at least 550° C., at least 600° C., at least 650° C., at least 700° C., at least 750° C., at least 800° C., at least 850° C., or at least 900° C. It should also be appreciated that heating the precursor material at temperatures above 1000° C. may provide charcoals with a very high surface area and pore volume. However, prolonged heating at high temperatures may damage the carbon structure leading to a decrease in surface area and pore volume.

The precursor material may be heated in the method for at least 10 minutes, at least 20 minutes, at least 30 minutes, at least 40 minutes, or at least 60 minutes. The material may be heated for at least 70 minutes, at least 80 minutes, at least 100 minutes, at least 110 minutes, or at least 120 minutes. In some embodiments, the material may be heated for more than 2 hours, such as 3, 4, 5 or even 6 hours or more.

As described in the examples, optimum results in terms of surface area and pore volume were obtained when the source material was heated for about 1 hour at about 800° C. Thus, the source material may be heated at a temperature between about 600° C. and about 1000° C., preferably between about 700° C. and about 900° C., more preferably between about 750° C. and about 850° C., and most preferably between about 780° C. and about 820° C. The source material may be heated for between about 30 mins and 120 mins, preferably between about 45 mins and 90 mins, or between about 50 mins and about 75 mins, at temperatures of around 800° C. At temperatures lower than 800° C., heating times can be longer, while at temperatures above 800° C. heating times should be reduced.

Following the heating step, the method may comprise a step of removing activating mineral ions from the heated precursor material to reveal or expose the pore structure of the resulting carbon. The activating mineral ions may be removed by acid washing, which may comprise contacting the heated composition with acid for a suitable time period. The acid may be any acid or a combination of acids, but sulphuric acid, hydrochloric acid or nitric acid are all good examples. The latter is advantageous as it allows harvesting of valuable fertilisers from the heated material in the form of potassium nitrate, calcium nitrate and magnesium nitrate. The heat-treated precursor material may be contacted with the acid for several hours, and preferably at least 12, 24, 36 or 48 hours or more, depending on acid strength. The acid wash treatment solubilises and removes the minerals within the pore structure of the precursor material, leaving behind an open porous structure.

After acid washing, the method may comprise separating the resultant carbon material from the acid, for example by filtration or centrifugation. Following separation from the acid, the method may comprise adjusting the pH of the carbon material until the pH indicates that the majority of the acid has been neutralised. This pH adjustment may be achieved by washing with water. Slight acidity at this stage may be the result of carboxyl groups formed on the carbon's surface during exposure to the acid during the acid wash. Once washed, the method may comprise drying the carbon to provide activated charcoal material.

Where the precursor material is algae, the algae may comprise a macroalgae or a microalgae. The algae may be *F. vesiculosus* (bladder wrack). Other examples of suitable macroalgae, which may be used as the precursor material, may include seaweeds, such as channel wrack, flat wrack, knotted wrack, bladder wrack, saw wrack, thong weed, kelp, oar weed, sea lettuce, etc. The algae may be derived from the family, Fucaceae, or the genus, *Fucus*. Examples of suitable microalgae may include filamentous algae and green algae. The algae may be a thread algae. Examples of thread algae include members of the genera *Spirogyra, Anabaena, Oscillatoria* and *Pithophora*. The algae may comprise a red algae, a brown algae or a green algae. Examples of green algae are those belonging to the class, Chlorachniophytes. A preferred algae may be derived from the family, Euglenaceae. For example, a preferred genus of green algae that is mass produced for biofuel production is *Euglena*.

The surface area of the activated charcoal produced by the method may be at least 300 m$^2$ g$^{-1}$, at least 350 m$^2$ g$^{-1}$, at least 400 m$^2$ g$^{-1}$, at least 450 m$^2$ g$^{-1}$, at least 500 m$^2$ g$^{-1}$, at least 550 m$^2$ g$^{-1}$, at least 600 m$^2$ g$^{-1}$, at least 800 m$^2$ g$^{-1}$, or at least 1000 m$^2$ g$^{-1}$, or more.

Meso- and micro-pore volumes of the activated charcoal produced by the method may be at least 0.2 cm$^3$ g$^{-1}$, at least 0.3 cm$^3$ g$^{-1}$, at least 0.4 cm$^3$ g$^{-1}$, at least 0.5 cm$^3$ g$^{-1}$, at least 0.6 cm$^3$ g$^{-1}$, at least 0.7 cm$^3$ g$^{-1}$, at least 0.8 cm$^3$ g$^{-1}$, or more.

The activated charcoal produced by the method of the first aspect may comprise mesoporosity of at least 30%, at least 35%, at least 40%, at least 45%, at least 50%, or at least 55%.

The inventors were surprised that activated charcoal produced by the method possessed unusually high levels of mesoporosity, as high as 55% of total pore volume in some embodiments. Mesoporosity can be defined as those pores with a width between 2 nm and 50 nm, and is in contrast to microporosity in which pores are less than 2 nm in diameter. Mesoporosity is believed to allow rapid diffusion of adsorbates through the pore structure improving the properties of the activated carbon for certain uses. Some of the compositions prepared by the method are highly micro-porous, but even these have higher meso-porosity than other commercially available activated carbons, which are generally less than 10% meso-porous.

EXAMPLES

The inventors set out to develop a new method for producing activated charcoal, based on a variety of different precursor materials derived from various plants and algae.

Example 1

Materials and Methods

The choice of precursor material was believed to be important to the method. Most activated charcoals are made from wood or coconuts shells which have a very low mineral content. However, the activated charcoals made with the present invention are derived from precursor materials having a high mineral content (mainly potassium, sodium, calcium and magnesium), i.e. the seaweed, bladder wrack, *Eucalyptus* bark, oil seed rape, sea beet and stinging nettle.

The precursor materials were first thoroughly dried at about 100° C. for at least 24 hours, or until no significant moisture remained. The materials were then placed into a steel tube equipped with a removable cap with a 3 mm hole at one end which allowed gases to escape during the pyrolysis and activation steps. The size and the position of this hole was such that insufficient air could contact the precursor material in the tube, which would otherwise cause it to combust. The tube containing the precursor material was sealed and then placed in a furnace, which accurately maintained a fixed temperature (i.e. 600° C., 800° C. or 1000° C.) for one or two hours, in order to allow pyrolysis and activation to occur.

After pyrolysis and activation had occurred, the tube containing the carbonised material was then removed from the furnace, and allowed to cool for at least 1 hour. The resultant carbon material was then removed from the tube, and then acid-washed, by contacting with a 0.1M hydrochloric acid solution for 48 hours. The acid wash treatment solubilised and removed the basic mineral compounds within the pore structure of the precursor material, leaving behind a vacant porous structure. Acid treatment proceeded for 48 hours to ensure complete removal of the minerals from within the charcoal structure. After acid washing, the resultant carbon material was separated from the acid by filtration, and then washed with water until the pH indicated that the majority of the acid had been removed. Slight acidity at this stage was the result of carboxyl groups formed on the carbon's surface during exposure to the hydrochloric acid during the acid wash. Once washed, the carbon was then dried to provide activated charcoal material for a range of different applications.

Following the treatment described above, surface area and pore characteristics of the resultant materials were analysed using the method of Brunauer, Emmett and Teller (S. Brunauer, P. H. Emmett and E. Teller, J. Am. Chem. Soc., 1938, 60, 309. doi:10.1021/ja01269a023). This method models the stacking of adsorbate particles during condensation in pores and on surfaces. The physical means by which the input data for the model is collected is by nitrogen gas adsorption/desorption at 77K. In this method the partial pressure of nitrogen gas is varied in a sealed container within which the sample to be measured is placed. The difference in predicted pressure and measured pressure after a given amount of nitrogen gas is introduced into the closed system indicated the amount adsorbed. Simultaneously, the partial pressure in the container at that point is measured. The partial pressure is plotted against the amount adsorbed by the sample to produce a sorption isotherm. This sorption isotherm may be analysed by the aforementioned BET method to determine the textural (Surface area porous properties) of the sample being analysed.

Results

Tables 1 and 2 summarises the effects of heating various precursor materials (plant- or algal-derived) at different temperatures.

TABLE 1

Properties of pyrolised precursor materials

| Precursor material | Surface area (m²/g) | pore volume (cm³/g) | Mesoporus % | Microporus % |
|---|---|---|---|---|
| Bladder wrack, 800° C. | 1036.6 | 0.849 | 56.3 | 43.7 |
| Eucalyptus, 800° C. | 433.7 | 0.244 | 32.7 | 67.3 |
| Oil seed rape, 800° C. | 478.5 | 0.318 | 58.1 | 41.9 |
| Sea beet, 800° C. | 648.1 | 0.391 | 33.0 | 67.0 |
| Sea beet, 1000° C. | 927.5 | 0.540 | 36.3 | 63.7 |
| Stinging nettle, 600° C. | 519.7 | 0.353 | 45.1 | 55.9 |
| Stinging nettle, 800° C. | 848.9 | 0.635 | 53.3 | 46.7 |
| Stinging nettle, 1000° C. | 958.9 | 0.629 | 44.1 | 55.9 |

As shown in Table 1, for the seaweed bladder wrack (*Fucus vesiculosus*), when heated to 800° C., the surface area of the resultant activated charcoal was over 1000 m²/g, and the pore volume was 0.849 cm³/g. The surface area and pore volume values for sea beet were higher when the material had been heated in the furnace at 1000° C. compared to pyrolysis at 800° C. Similarly, the surface area and pore volume values for stinging nettle increased with increasing temperatures. It has to be noted that the temperatures were those of the oven and it is possible that the temperature of biomass in the container that was placed in the oven was lower as a result of poor transfer of heat to the middle of the tube, especially when packed with a poorly conductive material.

The inventors have observed that the total mineral content appears to correlate closely with the surface area of the resultant activated charcoal following heat-treatment, as shown in Table 2 below which presents data from charred biomass (charred at 450° C.). In this experiment, the mineral content of the precursor materials was determined using inductively coupled plasma optical emission spectrometry (ICP-OES). This is an analytical technique used for the detection of trace metals. It is a type of emission spectroscopy that uses the inductively coupled plasma to produce excited atoms and ions that emit electromagnetic radiation at wavelengths characteristic of a particular element (J. Anal. At. Spectrom. 20: 11-16). The intensity of this emission is indicative of the concentration of the element within the sample.

TABLE 2

Average (n = 3) mineral content (mg kg$^{-1}$ charred plant material) of oil seed rape and sea beet and the surface area (m² g$^{-1}$) of activated charcoal produced from these materials when charred at 800° C.

| Precursor material | Mineral content charred plant material (mg kg$^{-1}$) | | | | | Surface area (m²g$^{-1}$) |
|---|---|---|---|---|---|---|
| | K | Mg | Ca | Na | Total | |
| Oil seed rape | 83,000 | 4,000 | 65,000 | 4,000 | 156,000 | 500 |
| Sea beet | 95,000 | 16.700 | 18,700 | 96,700 | 222,000 | 950 |

As can be seen in Table 2, the higher the mineral content of the precursor material, the higher the surface area of the resultant activated charcoal. The inventors have therefore demonstrated that the method of the invention works well with a variety of precursor materials including oil seed rape straw, which, when heated at 800° C. for about 2 hours results in an activated carbon/charcoal with a surface area of greater than 500 m²g$^{-1}$. For the sea beet, a surface of area of at least 950 m²g$^{-1}$ was obtained, while bladder wrack heated at 800° C. gave a surface area of greater than 1000 m²g$^{-1}$, which astounded the inventors. These surface area values are significantly greater than 10 to 80 m²g$^{-1}$, which may be achieved using normal charring or flash pyrolysis. Of even greater significance are the large pore volumes values of the materials (up to 0.6 cm³/g for beet leaves and 0.8 cm³/g for bladder wrack) most of which was in the meso-pore range, making these materials exceptionally suited to be used for the removal of pollutants with large molecular sizes.

Discussion

Potassium is one of the most common elements in growing plant tissues and is found in the highest concentrations in fast growing plants, or parts thereof, such as the leaves. Plants that are exceptionally rich in potassium include Cruciferae or Brassicaceae (such as oil seed rape), nettle, spinach, sugarbeet leaves and swiss chard leaves. Similarly, the bark of trees is richer in potassium than core-wood, and the inventors believe that an activated charcoal with a surface area of around 500 m²g$^{-1}$ can be made from *Eucalyptus* bark (for comparison, the core wood of 2 cm diameter stems gave a surface area of 200 m²) following exposure for 2 hours to 800° C.

Although the inventors do not wish to be bound by theory, the method of the invention is based on the hypothesis that carbonates that are formed during charring at lower temperatures (e.g. below about 600° C.), disintegrate at high temperatures (e.g. above about 600-700° C.), which are believed to result in the formation of a carbon structure with an exceptionally large surface area. Precursor materials that are most useful for activation using the method include beet tops, nettle stems and leaves, spinach leaves, oilseed rape straw, bladder wrack, etc. One important feature of the precursor plant material is that it has a high combined potassium, sodium, calcium and/or magnesium content, which, after charring at low temperature (below 600° C.), are converted into the carbonates. The resulting carbonate content of the charcoal should be between 10 and 60% to give the best activation results. The precursor plant material does not require any chemical modification, or to be mixed with any additional activating chemicals. Finally, during the pyrolysis reaction (i.e. the heating step), no additional activation methods are required such as the addition of $CO_2$ and/or super heated steam, as in prior art methods.

Example 2

Factors (Mineral Content, Temperature and Heating Time) that Affect the Quality of Intrinsically Activated Carbons As described in Example 1, the inventors have hypothesised that minerals (such as Ca, Mg, Na and K) that are present within different source materials, are converted to carbonates when the material is pyrolysed at temperatures below 600° C. When the temperature is raised subsequently, these carbonates are believed to disintegrate into $CO_2$ and metal oxides. The inventors believe that this leads to the formation of meso- and micro-pores within the carbon structure. It follows therefore that if this hypothesis holds, the more minerals there are within a given source material, then the more pores are formed, resulting in a strong positive correlation between mineral content of the precursor material and the surface area of the carbon produced. Clearly, it is possible that a source material contains so much mineral that holes start to merge, leading to a reduction in surface area. However, it is unlikely that this would be the case with most natural precursors, and a straight line correlation between mineral content and surface area is expected.

However, it was expected that besides mineral content, temperature may also play a crucial role in pore formation, mainly because different carbonates disintegrate at different temperatures. For example, $K_2CO_3$ and $Na_2CO_3$ will disintegrate at temperatures of around 600° C., while $CaCO_3$ will disintegrate at temperatures of around 800° C. Similarly, it will take time before all the carbonates have disintegrated, and so the inventors wanted to determine the optimum heating times.

To quantify the effects of mineral content, charring temperature and charring time, a range of experiments was set up where source materials with different mineral contents were charred at temperatures between 450 and 1000° C. Some key source materials were subsequently charred at the most optimum temperature for between 1 and 4 hours.

Maximum surface area of the different intrinsically activated carbons was correlated with mineral content of the source materials.

Materials and Methods: Source Materials—

Seven source materials were used to determine the effect of mineral content, mineral composition, charring temperature and charring time on the characteristics of intrinsically activated carbons. Source materials were chosen with low to high mineral content (Table 3). Source materials were derived from the following plant/algal species: Eucalyptus (*Eucalyptus* spp), oilseed rape (*Brassica napus*), nettle (*Urtica dioica*), bladder wrack (*Fucus vesiculosis*) and sea beet (*Beta vulgaris*). All source materials were derived from a single batch. Source materials were dried at 100° C. for 48 hrs before pyrolysis. Mineral contents of the different source materials were determined by inductively coupled plasma mass spectrometry (ICP-MS) following aqua-regia digest of the material.

TABLE 3

Mineral content dried (mg $kg^{-1}$ dried plant material) of different source materials

| Source material | Mineral content of dried biomass (mg $kg^{-1}$) | | | | |
|---|---|---|---|---|---|
| | K | Na | Mg | Ca | Total |
| Eucalyptus (Heart wood) | 1,500 | 700 | 200 | 1,900 | 4,200 |
| Eucalyptus (Soft wood) | 2,100 | 900 | 200 | 3,200 | 6,500 |
| Eucalyptus (Bark) | 4,900 | 2,500 | 2,700 | 60,710 | 70,730 |
| Oil Seed Rape (Straw) | 20,470 | 600 | 400 | 10,370 | 30,940 |
| Sea Beet (Leaves) | 40,950 | 30,270 | 5,100 | 8,500 | 90,570 |
| Nettle (Leaves and stems) | 50,630 | 1,100 | 9,000 | 30,480 | 100,110 |
| Bladder wrack | 30,380 | 40,680 | 9,700 | 10,500 | 100,530 |

Pyrolysis Process:

Production of char was carried out using a high temperature muffle furnace (Carbolite, UK). Chars were produced by placing the source material inside a steel container of 25 cm in length and 8 cm diameter with one end sealed and a steel lid secured on the other end. Two holes were drilled in the sides of the lid and the end of the tube over which it was to be placed; one hole had a screw inserted to secure the lid in place, the other was left open to allow the exhausting of gases while providing minimal opportunity for air to enter the container. To heat the container to the required temperature, it was placed in the muffle furnace and heating was carried out at a fixed rate of 100° C. per 15 mins until the final pyrolysis temperature was reached. This temperature was maintained for the required period of time, after which time the furnace was switched off, and the door opened to allow rapid cooling of approximately 100° C. per 15 mins. Temperature changes were monitored using a laser assisted infrared heat sensor which was directed at the rear end of the container (where the pyrolysis took place.)

Post Pyrolysis Treatment:

After pyrolysis, minerals were removed from the char using an acid wash before the carbons were characterised in terms of surface area, pore distributions and pore volume. This was achieved by washing the chars for 48 hrs in a 0.1 M solution of hydrochloric acid. This procedure solubilises most metal salts and washes them out of the carbon structure. Following this, the carbons were dried in an oven at 100° C. for 48 hrs before characterisation of each char.

Surface Characterisation of Carbons:

Nitrogen adsorption—desorption at 77° K was used to characterise the surface structure of the carbons using a micrometrics Gemini V surface area and pore size analyser. Samples were cooled to 77° K by immersion in liquid nitrogen and out-gased in a micrometrics flowprep060. Surface area was modelled using the BET method while total porosity was determined by single point adsorption. The T-plot method was used to determine the micropore (<1 nm) content of carbons from the nitrogen adsorption isotherms. Average pore diameter was calculated as well.

Treatments: To determine the effect of mineral content, all materials were processed at 800° C. for one hour before processing of the materials as described above.

To determine the effect of charring temperature, dried bladder wrack and oil seed rape straw were processed for one hour at temperatures of 450° C., 600° C., 650° C., 700° C., 750° C., 800° C., 850° C., 900° C., 950° C., and 1000° C.

To determine the effect of heating time, dried bladder wrack was pyrolysed for 1, 2, 3 or 4 hours at 600 and 800° C.

Results: Effect of mineral content of source materials on carbon properties

TABLE 4

Average mineral content (K, Ca, Mg, Na), mineral content of K and Na in different source materials and the maximum resulting surface area of the pyrolysed carbon derived from each source material. (n = 3)

| Source material | Total mineral content (%) | K + Na content (%) | Maximum surface area (m$^2$/g) |
|---|---|---|---|
| Bladderwrack | 10.53 | 8.06 | 1037 |
| Seabeet | 9.57 | 8.22 | 928 |
| Nettle | 10.11 | 5.736 | 959 |
| Eucalyptus bark | 7.73 | 0.74 | 434 |
| Eucalyptus heart | 0.42 | 0.217 | 266 |
| Eucalyptus sapwood | 0.65 | 0.3017 | 308 |
| oilseed rape | 3.94 | 2.532 | 478 |

TABLE 5

Surface characteristics of carbons with different mineral contents processed at 800° C. for one hour:

| | Carbon characteristics | | | | | | | |
|---|---|---|---|---|---|---|---|---|
| Source Material | Mineral Content (%) | BET Surface area (m$^2$/g) | Total Pore volume (cm$^3$/g) | Mesopore volume (cm$^3$/g) | Micropore volume (cm$^3$/g) | % Meso-pores | % Micro-pores | Average pore width (nm) |
| *Eucalyptus* heart wood | 0.42 | 266 | 0.14 | 0.04 | 0.10 | 26.6 | 73.4 | 2.09 |
| *Eucalyptus* Sap wood | 0.65 | 308 | 0.16 | 0.04 | 0.12 | 26.9 | 73.1 | 2.09 |
| *Eucalyptus* Bark | 7.73 | 434 | 0.24 | 0.08 | 0.16 | 32.8 | 67.2 | 2.25 |
| Oil Seed Rape straw | 3.94 | 478 | 0.32 | 0.19 | 0.13 | 58.1 | 41.9 | 2.66 |
| Sea beet Leaves | 9.57 | 648 | 0.39 | 0.13 | 0.26 | 33.0 | 67.0 | 2.42 |
| Nettle Leaves and stalks | 10.11 | 849 | 0.64 | 0.34 | 0.30 | 43.9 | 56.1 | 2.99 |
| Bladder wrack | 10.53 | 1037 | 0.85 | 0.49 | 0.36 | 42.6 | 57.4 | 3.28 |

Tables 4 and 5 show that different source materials produce activated carbons with different properties. The best carbons were produced from biomass that contained large amounts of minerals. Whereas sea beet leaves, nettle leaves and stalks and bladder wrack fonts had similar mineral contents (around 10% by weight), the total pore volume of activated bladder wrack char was more than twice as large as the pore volume of char produced from sea beet leaves, while the amount of mesopores in bladder wrack char was >3 times greater than that of sea beet (Table 5). Whereas the carbons produced from non-woody materials were in general soft, the ones produced from bladder wrack were surprisingly hard and would make excellent granulated activated carbon (GAC).

Referring to FIG. 1, there is shown the relationship between the total mineral content of source material and the maximum achievable surface area of activated carbons derived from each. Referring to FIG. 2, there is shown the relationship between combined K and Na content of source material and maximum achievable surface area of activated carbons derived from each.

The results presented in FIGS. 1 and 2 confirm the hypothesis that there is a strong positive correlation between surface area and the mineral content of the source material from which the activated carbon was derived, with a $R^2$ value between the total mineral content of the precursor and total surface area achievable of 0.823 (see FIG. 1), which suggests that different minerals affect pore structure differently. When Ca was excluded from the analysis the correlation between mineral content (K and Na) was 0.935 (see FIG. 2), which suggests that K and Na behave similarly in the activation process, and that Ca is less active in pore formation as a function of its percentage mass. The result is that precursors with a large calcium content form lower surface carbons than those with a predomination of potassium and sodium. This effect reduces the correlation between mineral content including calcium and maximum surface area. It is clear that while calcium has less pore forming activity as a function of mass, it does play a significant role in pore formation meaning that high calcium samples are outliers on both graphs. In spite of the calcium data, the correlations are good enough to conclude that the vast majority of the variance in surface area can be attributed to the mineral content of the precursors.

Effect of Pyrolysis Temperature on Activated Carbon Properties

Referring to FIG. 3, there is shown the effect of temperature on BET surface area of intrinsically activated carbons produced from oilseed rape straw. Largest BET surface areas were obtained when dried oil seed rape straw was heated at 800° C. (as shown in FIG. 3). Similarly, the greatest pore volume, meso-pore volume and micro-pore volume were obtained at a charring temperature of 800° C., but average pore width was greatest at temperatures between 850 and 950° C. (see Table 6). Lower temperatures most likely resulted in carbonates not disintegrating to metal-oxides and carbon dioxide while high temperatures are likely to be damaging to the carbon structure itself resulting in the disintegration of pores.

TABLE 6

Effect of temperature on the pore structure of intrinsically activated carbons produced from oil seed rape straw

| Temperature (° C.) | Carbon characteristics | | | | | |
|---|---|---|---|---|---|---|
| | Total Pore volume (cm³/g) | Meso-pore volume (cm³/g) | Micro-pore volume (cm³/g) | % Meso-pores | % Micro-pores | Average pore width (nm) |
| 450 | 0.123 | 0.095 | 0.028 | 77.2 | 22.8 | 3.55 |
| 600 | 0.173 | 0.071 | 0.102 | 41.0 | 59.0 | 2.47 |
| 700 | 0.212 | 0.110 | 0.102 | 51.9 | 48.1 | 2.74 |
| 750 | 0.246 | 0.113 | 0.133 | 45.9 | 54.1 | 2.64 |
| 800 | 0.320 | 0.186 | 0.134 | 58.1 | 41.9 | 2.66 |
| 850 | 0.251 | 0.126 | 0.125 | 50.2 | 49.8 | 2.86 |
| 900 | 0.283 | 0.169 | 0.114 | 59.7 | 40.3 | 2.94 |
| 950 | 0.228 | 0.128 | 0.100 | 56.1 | 43.9 | 2.92 |

Referring to FIG. 4, there is shown the effect of temperature on BET surface area of intrinsically activated carbons produced from bladder wrack. As with oilseed rape, the largest BET surface areas and largest pore volumes were obtained when dried bladder wrack fonts were heated at 800° C. for one hour (see FIG. 4, and Table 7). Charring at temperatures above 800° C. for an hour led to a gradual deterioration of the porestructure with increasing temperatures (see Table 7). Charring at 1000° C. yielded char with less than half the surface area of char produced at 800° C. (see FIG. 4). Similarly, total pore volume was more than halved when bladder wrack was charred at 1000° C. compared to char produced at 800° C. (see Table 7). Interestingly, the ratio between mesopores and micro-pores hardly changed with increasing temperatures and the proportion of mesopores stayed between 57% and 71% between charring temperatures of 600 and 1000° C. This means that bladder wrack char is extremely meso-porous with an average pore size width of around 4 nm and a maximum mesopore volume of 0.672 cm³/g (see Table 7). These characteristics make this carbon a prime candidate for use in decolourisation.

TABLE 7

Effect of temperature on the pore structure of intrinsically activated carbons produced from bladder wrack:

| Temperature (° C.) | Pore structure characteristics | | | | | |
|---|---|---|---|---|---|---|
| | Total Pore volume (cm³/g) | Meso-pore volume (cm³/g) | Micro-pore volume (cm³/g) | % Meso-pores | % Micro-pores | Average pore width (nm) |
| 450 | 0.146 | 0.139 | 0.007 | 95.7 | 4.3 | 11.4 |
| 600 | 0.352 | 0.250 | 0.102 | 71.0 | 39.0 | 4.2 |
| 650 | 0.270 | 0.261 | 0.090 | 65.5 | 34.5 | 4.0 |
| 700 | 0.578 | 0.384 | 0.194 | 65.4 | 34.6 | 4.1 |
| 750 | 0.615 | 0.357 | 0.258 | 58.0 | 42.0 | 3.3 |
| 800 | 0.849 | 0.487 | 0.362 | 57.4 | 42.6 | 3.3 |
| 850 | 0.952 | 0.672 | 0.280 | 70.6 | 29.4 | 4.4 |
| 900 | 0.620 | 0.414 | 0.206 | 66.8 | 33.3 | 3.8 |
| 950 | 0.740 | 0.510 | 0.230 | 66.9 | 33.1 | 4.0 |
| 1000 | 0.452 | 0.321 | 0.131 | 71.0 | 29.0 | 4.0 |

Effect of pyrolysis duration at 600 or 800° C. on activated carbon properties of bladder wrack: Referring to FIG. 5, there is shown the effect of charring time (h) at 600° C. on BET surface area of intrinsically activated carbons produced from bladder wrack. Heating at 600° C. for prolonged periods (2-4 hours) resulted in more than a doubling of the surface area and the pore volume of the char derived from bladder wrack (see FIG. 5 and Table 8). However, the surface area achieved at 600° C. never exceeded 304 m²/g, even after a charring time of 4 hours, while pore volume was also less than half of that obtained when bladder wrack was pyrolysed at 800° C. (FIG. 5; Table 8). This suggests that some of the minerals present in the char may not have contributed to pore formation at this temperature, supporting the hypothesis that $CaCO_3$ does play a significant role in the activation process of intrinsically activated carbons.

Referring to FIG. 6, there is shown the effect of charring time (h) at 800° C. on BET surface area of intrinsically activated carbons produced from bladder wrack. $CaCO_3$ disintegrates at 800° C., which would explain why charring at 800° C. is necessary to obtain a large surface areas, potentially in excess of 1000 m²/g (FIG. 6). Heating at 800° C. for prolonged periods of time led to the gradual decline of surface area at a rate of around 100 m²/h (FIG. 6). However, total pore volume stayed roughly the same after 2 hours heating with meso-pore volume increasing by >10% from 0.487 cm³/g to 0.541 cm³/g. Prolonged heating for 3 to 4 hours, however, resulted in a decline in total pore volume, meso-pore volume as well as micro-pore volume (Table 8).

TABLE 8

Pore structure characteristics:

| Temperature (° C.) | Heating Time (h) | Pore structure characteristics | | | | | |
|---|---|---|---|---|---|---|---|
| | | Total Pore volume (cm³/g) | Meso-pore volume (cm³/g) | Micro-pore volume (cm³/g) | % Meso-pores | % Micro-pores | Average pore width (nm) |
| 600 | 1 | 0.147 | 0.099 | 0.048 | 67.2 | 32.8 | 4.2 |
| | 2 | 0.326 | 0.217 | 0.109 | 66.6 | 33.4 | 4.2 |
| | 3 | 0.248 | 0.166 | 0.082 | 67.1 | 32.9 | 4.3 |
| | 4 | 0.354 | 0.249 | 0.105 | 70.3 | 29.7 | 4.7 |
| 800 | 1 | 0.849 | 0.487 | 0.362 | 57.4 | 42.6 | 3.3 |
| | 2 | 0.854 | 0.541 | 0.313 | 63.3 | 36.7 | 3.7 |
| | 3 | 0.818 | 0.514 | 0.304 | 62.8 | 37.2 | 3.7 |
| | 4 | 0.658 | 0.385 | 0.273 | 58.5 | 41.5 | 3.3 |

It is clear that mineral content of the source material is the main factor that determines surface area of intrinsically (without adding external activating agents) activated carbons. Thus, selection of suitable source materials for intrinsic activation can be based solely on the mineral content of the source material. Activated carbon produced from bladder wrack contains a surprisingly high volume of meso-pores and its hardness would make it suitable for use as a granular activated carbon. The best results in terms of surface area and pore volume were obtained when carbons were heated for 1 hour at 800° C. Higher temperatures or more prolonged heating times seem to damage the carbon structure itself leading to its disintegration.

Example 3

Comparisons Between Intrinsically Activated Carbons and Commercially Available Activated Carbons Activated carbon is a material used in a wide range of industrial processes notably water purification and conditioning. Active carbons are those which have been treated to generate nano-scale porosity in the carbon conferring a large surface area (>500 m²/g.). This large surface area enhances the adsorption capacity of the carbon for any molecule which will fit into the pores. The pore structure can be generated by two types of process: physical activation or chemical activation. In physical activation high temperatures and oxidising gases are used to remove carbon atoms from the microscopic structure of an amorphous carbon. Chemical activation involves washing chemical agents into the carbon followed by treatment with high temperatures to cause a chemical reaction which produces the microscopic porosity.

In contrast, intrinsic activation uses specific source materials such as bladder wrack or oilseed rape straw. These source materials are chosen for their high soluble mineral content. These soluble minerals are precursors to the formation of substances which can take part in activation. The source materials are pyrolysed to produce the activated carbons and the product is washed to remove residual soluble mineral content. This final step is believed to be important as it is required to expose the pore structure. The process occurs efficiently when pyrolysis is carried out at specific temperatures and for specific durations.

Intrinsic activation of carbons provides a cheap and simple method to produce activated carbons using readily available source materials that until now were regarded as being unsuitable for the production of activated carbons, mainly because of their high mineral content. However, because of the reliance on minerals already present in the source materials, and the varying consistency of the source materials themselves, intrinsic activation results in wide spectrum of activated carbons that has different market values and applications.

One standard measure of activated carbon performance is the measurement of adsorption capacity of the carbon for organic molecules from aqueous solution. This is usually determined using dyes due to the simplicity by which decolourisation can be quantified using spectrophotometry. To determine the efficacy of the carbons described herein, they were compared with two high grade decolourisation carbons produced by Fisher and Norit. A standard method using methylene blue adsorption was used to determine the quality of each carbon. Quantification was by the multi-point isotherm method in which the same amount of carbon was added to identical volumes but with different concentrations of the dye. This allows quantification of the adsorption process in terms of adsorption at a range of methylene blue concentrations and to effectively determine the maximum adsorption capacity of each carbon (Methylene Blue number is expressed as g methylene blue adsorbed by 100 g carbon). Below are presented comparative data on some intrinsically activated carbons and some activated carbons that are commercially available.

Results: Comparisons of Intrinsically Activated Carbons and Commercial Products—

The surface area and pore volumes of a range of intrinsically activated carbon produced from bladder wrack, nettle, sea beet and nettle were compared with some commercially available activated carbons. For comparison, Nuchar is a recognised brand of activated carbon produced from wood using steam activation. Nuchar™ is marketed predominantly as a sorbent for organic molecules and particularly for decolourisation.

TABLE 9

Properties of selected intrinsically activated carbons (AC) produced from different source materials and using optimum process conditions and properties of typical commercially available activated carbons (in bold):

| Source material for intrinsically activated carbon | Reference activated carbon | Maximum Surface area (m²/g) | Pore volume (cm³/g) | Average pore diam. (nm) |
|---|---|---|---|---|
| Bladder wrack | | 1547 | 1.40 | 4.0 |
| | Nuchar ® wood based AC | 1200 | 1.20 | 3.0 |
| Stinging nettle | | 959 | 0.64 | 2.9 |
| Beet leaves | | 928 | 0.54 | 2.3 |
| | Coal based AC | 800 | 0.50 | 2.3 |
| | Lignite based AC | 600 | 0.50 | 2.8 |
| Oilseed Rape | | 478 | 0.32 | 2.7 |
| Eucalyptus bark | | 434 | 0.24 | 2.2 |

The best carbons produced using intrinsic activation using the method of the invention compares favourably to the highest grade activated carbons, such as Nuchar®. Intrinsically activated carbons produced from crop residues such as beet leaves and oilseed rape straw show similar surface areas as commercially activated carbons produced from coal and lignite (see Table 9).

The majority of commercially available activated carbons are prepared using physical activation due to the lower cost and greater convenience of using oxidising gasses as opposed to chemical activating agents. Chemically activated carbons however tend to contain larger pores and are therefore more versatile and can be used to adsorb molecules with larger diameters. Intrinsic activation is a form of chemical activation and therefore carries many of the benefits of chemical activation without the cost of the chemicals or the inconvenience of having to combine them with the precursor. The most striking feature of intrinsic activated carbons (especially those derived from bladder wrack and nettle) is their extremely large pores and open porous structure (see Table 9).

Comparison of bladder wrack carbon performance for aqueous organic adsorption processes against Norit and Fisher decolourisation carbons: Referring to FIG. 7, there is shown an adsorption isotherm of Norit decolourisation carbon using a range of methylene blue concentrations in water. FIG. 8 shows an adsorption isotherm of Fisher decolourisation carbon using a range of methylene blue concentrations in water. FIG. 9 shows an adsorption isotherm of Bladder wrack carbon using a range of methylene blue concentrations in water.

The isotherms presented in FIGS. 7-9 show that all three carbons perform similarly for adsorption of the dye from aqueous solution with a MB number of 25 for Norit AC, a MB number of 22 for Fisher AC and a MB number of 25 for intrinsically activated carbon derived from bladder wrack. Norit is the gold standard carbon for decolourisation and the favourable performance of the bladder wrack based activated carbon suggests that it would also be useful for this function in a commercial setting. Carbons produced for decolourisation and organic adsorption are generally very meso-porous and both Norit and BW8-1 (intrinsically activated bladder wrack carbon) have both average pore sizes of >3.6 nm.

Referring to FIGS. 10 and 11, there are shown the pore size distribution curve for the most highly activated carbon (Bladderwrack pyrolysed at 800° C., FIG. 10) compared with commercially available activated carbon from Norit (FIG. 11). Pore distribution is given by the change in pore volume (cm³) as a function of the change in the Log of the pore diameter (Å). As can be seen, intrinsically activated carbon derived from bladder wrack has a larger number of pores in the >10 nm range (FIG. 10) while Norit AC has a pore size distribution which is dominated by pores with a width of around 10 nm (FIG. 11). This prevalence of larger mesopores may explain the high performance of the bladder wrack carbon.

Intrinsic activated carbons posses a unique pore distribution pattern which may help to explain their surprisingly high performance. The carbons produced using the method of the invention possess a pattern of extensive macroporosity and mesoporosity which increases in volume linearly with increasing pore size when plotted on distribution curves.

Characterisation of intrinsically activated carbons: From FIG. 10, it is possible to see the relative contributions of different pore size classes to the overall pore volume of the charcoal derived from bladder wrack processed by pyrolysis at 800° C. The curve obtained with intrinsically activated carbon derived from bladder wrack clearly shows that the contribution to pore volume made by different pore size classes is not normally distributed or random. The first part of the curve near the origin shows that both large micro-pores and small mesopores make a large contribution to the overall pore volume. The contribution to total volume of pores greater than 2 nm is smaller for each increase in pore size but these pores are distributed more widely. Thus, the overall contribution of the larger pores is relatively large. This carbon also shows a large proportion of highly developed large meso-pores with a diameter greater than 10 nm. This may be seen as the uptick in the distribution graph from 10 nm and upwards. This pattern of large meso-pores is clearly visible on the pore size distribution curves of many of the activated carbons that are produced using minerals that are already present in the source materials, as shown in FIGS. 12-15.

Referring to FIG. 12, there is shown the pore size distribution of intrinsically activated sea beet carbon measured by BJH nitrogen adsorption. FIG. 13 shows the pore size distribution of intrinsically activated nettle carbon measured by BJH nitrogen adsorption. FIG. 14 shows pore size distribution of intrinsically activated rape straw measured by BJH nitrogen adsorption, and FIG. 15 illustrates the pore size distribution of intrinsically activated *eucalyptus* bark measured by BJH nitrogen adsorption. Pyrolysis temperature was 800° C. for each of FIGS. 12-15.

It is clear that intrinsic activation of a range of source materials results in carbons that compare very favourably with commercially available carbons. Intrinsically activated seaweed (bladder wrack) provides a specialised carbon that ranks among the best decolourisation carbons available on the market. Intrinsic activation results in a distinct pore size distribution dominated by large meso-pores.

What is claimed is:

1. A method of making activated charcoal, comprising:
heating a precursor material having a high mineral content to a temperature of between 600° C.-1000° C., for at least 10 minutes to obtain an activated charcoal, wherein the concentration of alkali and/or alkaline earth metals of the precursor material in a dry state is at least 20,000 mg/kg; and no exogenous activating material is added to obtain the activated charcoal and washing the activated charcoal with acid to remove an activating mineral ion to reveal a pore structure; and collecting the mineral ion in the acid wash.

2. The method of claim 1, wherein the alkali and/or alkaline earth metals comprise is at least one of a magnesium, sodium, calcium and potassium.

3. The method of claim 1, wherein the pore structure of the activated carbon comprises at least one of meso pore and micro pore; wherein the meso- and micro-pore volumes are at least one of a 0.2 cm$^3$ g$^{-1}$, 0.5 cm$^3$ g$^{-1}$, and 0.8 cm$^3$ g$^{-1}$, and wherein the activated charcoal comprises mesoporosity of at least 30%.

4. The method of claim 1, further comprising:
separating the resultant activated carbon from the dissolved minerals.

5. A method according to claim 1, wherein the concentration of alkali and/or alkaline earth metals is at least 60,000 mg/kg of the precursor material in a dry state.

6. A method according to claim 2, wherein the concentration of potassium is at least 10,000 mg/kg of the precursor material in a dry state, and/or the concentration of magnesium is at least 1,000 mg/kg of the precursor material in a dry state, and/or the concentration of calcium is at least 3,000 mg/kg of the precursor material in a dry state, and/or the concentration of sodium is at least 1,000 mg/kg of the precursor material in a dry state.

7. A method according to claim 1, wherein the precursor material comprises of a hardwood species of plant or a softwood species of plant.

8. A method according to claim 1, wherein the precursor material is a non-woody plant material selected from the group consisting of Brassicaceae, Amaranthaceae, Urticaceae, *Spinacea oleracea* (spinach), *Brassica napus* (oilseed rape) and *Beta vulgaris* (sea beet, mangel-wurzel, and swiss chard).

9. A method according to claim 1, wherein the precursor material comprises algae and the algae comprises of macroalgae or microalgae, wherein the precursor material comprises of seaweed, such as channel wrack, flat wrack, knotted wrack, bladder wrack, saw wrack, thong weed, kelp, oar weed and sea lettuce.

10. A method according to claim 9, wherein the algae is derived from the family Fucaceae or Euglenaceae.

11. A method according to claim 1, wherein the precursor material is heated to a temperature of at least 700° C.

12. A method according to claim 4, wherein, following separation from the acid, the method comprises adjusting the pH of the resultant activated carbon until the pH indicates that the majority of the acid has been neutralized, optionally wherein pH adjustment is achieved by washing with water.

* * * * *